Oct. 31, 1939.          G. M. WRIGHT ET AL          2,178,027
                        ALTIMETER FOR AIRCRAFT
                         Filed June 24, 1936

Patented Oct. 31, 1939

2,178,027

UNITED STATES PATENT OFFICE 2,178,027

ALTIMETER FOR AIRCRAFT

George Maurice Wright, Bicknacre, Chelmsford, and Archibald McLellan, Bayswater, London, England, assignors to Marconi's Wireless Telegraph Company, Limited, London, England, a company of Great Britain Application June 24, 1936, Serial No. 87,110
In Great Britain June 26, 1935

3 Claims. (Cl. 73—4)

This invention relates to altimeters and more particularly to altimeters of the aneroid barometer type.

Suitably calibrated aneroid barometer instruments are in common use at the present time as altimeters on aircraft and a serious defect of such altimeters as at present in common use is that they are liable to types of errors known as hysteresis lag or creep. Such altimeters read, of course, over a large range of pressure and it is found that if such an instrument be set at zero at an aerodrome and be then taken up by an aircraft to a considerable height and for a considerable time, it will probably register (due to the aforementioned errors which are practically always present in known, wide range, aneroids) a substantial height reading when the aircraft returns to the aerodrome even though there has been no change in barometric pressure at said aerodrome in the meantime. The seriousness of this defect is obvious for such an altimeter may lead the pilot of an aircraft, when making a landing under conditions of bad visibility, to believe that he is a hundred feet or more above ground when in fact he is almost at ground level.

The primary object of this invention is to avoid danger from the above mentioned cause and this object is achieved by providing, upon an aircraft, an aneroid type of altimeter (supplementary to that normally provided) having a relatively small effective range sufficient for landing purposes (a full scale deflection of 500 feet or 1,000 feet, for example), the aneroid capsule being housed within a hermetically sealed container capable of being put into communication with the surrounding atmosphere or cut off from the surrounding atmsphere at will.

According to this invention an altimeter of the aneroid barometer type comprises an aneroid capsule, or the like, which is mounted within an hermetically sealed chamber having a valve or the like whereby said chamber can, at will, be put into communication with the surrounding atmosphere. The said altimeter should be constructed to have a relatively small effective range sufficient for landing purposes, i. e., a range of the order of 500 feet or 1,000 feet or thereabouts.

Preferably the altimeter has two independently movable scales situated one within the other and adapted to co-operate with the indicator member thereof, one of these scales being marked in units of barometric pressure and the other in units of heights.

Preferably also means are provided for maintaining the aneroid movement at a predetermined temperature or between predetermined limits of temperature and/or the chamber is lagged to protect it against ambient temperature changes.

The invention is illustrated in the accompanying drawings in which

Figure 1 is a schematic view in sectional elevation of one form of instrument embodying the invention;

Figure 2 is a fragmentary plan view of two associated scale rings; and

Figure 3 is a diagrammatic view illustrating the application of a full range altimeter for automatically opening and closing a valve.

Referring to Figures 1 and 2 of the drawing an aneroid movement comprises a frame $a$ upon which is mounted an aneroid capsule $b$ having the usual restoring spring $c$ and operating through a movement lever connecting link and fusee chain system $d$, $e$, $f$, a pointer $h$ with which is associated a return hair spring $g$. This movement is all well known per se, and need not therefore be described in detail herein. The arrangement is such that full scale deflection (one revolution, or thereabouts) of the pointer corresponds to a change of height of say, 500 feet or 1,000 feet. An instrument of such a relatively small range can, of course, readily be constructed to have only negligible hysteresis or lag error in terms of feet—quite insufficient error seriously to mislead an aircraft pilot. The whole movemean is mounted within an hermetically sealed chamber $i$ provided with an observation window through which the pointer can be seen, and suitably lagged, for example as indicated by the reference $j$ with heat insulating material. There are two scale rings mounted outside the chamber and above the window, these rings being arranged concentrically inside one another and independently rotatable. The outer scale ring $k$ which can be rotated by means of a knob $l$ is marked in units of barometric pressure, e. g., millibars, and the inner ring $m$ which can be rotated by means of a knob $n$ is marged in units of heights, e. g., feet. The knobs $l$ and $n$ both are fixed against movement relatively to the casing $i$ with the exception, of course, of their rotary movement about their fixed axes, hence each knob holds its associated ring against rotation except when the knob is operated and the rings $k$ and $m$, therefore, are independently rotatable. Within the chamber is a thermostatic switch $o$ of any construction well known per se which automatically controls the electrical energy which is fed from a source (not shown) to a lamp or other electrical heater device p (also within the chamber) in such manner as to maintain the interior of the chamber at or near some predetermined temperature which is preferably well above the highest ambient temperature to be expected. The chamber is provided with an air admission port or passage r controlled by a manually operable needle or other valve q so that said port can be open or closed at will.

This instrument, which is intended to be fitted on an aircraft in addition to the normally provided full range altimeter, is used as follows. Before a flight is commenced the inner or height scale m is rotated relatively to the outer scale k until the reading given by the zero mark on the scale m upon the scale k corresponds to the barometric pressure at the aerodome—as given for example by the normally provided standard barometer at the aerodrome. The two scales are then rotated together, keeping their relative positions unchanged, until the pointer h reads zero on the height scale m. During these initial adjustments the valve q is kept open. The outer scale k is then clamped (by means not shown) in its position of adjustment, the valve q is closed and the flight can commence. Since the chamber is now hermetically sealed and maintained at substantially constant temperature, the capsule b will not be subjected to changing conditions during flight. When a landing is to be made the pilot obtains, by wireless communication, information as to the barometric pressure at the proposed landing place and then rotates the height scale m until the reading, as given by the zero mark on this scale upon the outer scale k is the same as the barometric pressure at the proposed landing place. When the aircraft has descended to a height well within the range of the landing altimeter—e. g., when the reading as given by the normally provided full range altimeter is a few hundred feet—the pilot opens the valve q, whereupon the reading of the needle h upon the scale m will indicate directly the height of the aircraft relative to the proposed landing place.

In some cases, e. g., for installations on machines intended to make only relatively short flights, the thermostat and heater may be eliminated, since the lagging will be sufficient to prevent any appreciable error due to temperature change. The provision of controlled heating is, however, generally to be preferred for obvious reasons. Where controlled heating is provided the control need not be thermostatic, for manual control can be resorted to; again, however, thermostatic control is preferred.

Although in the above description it has been stated that the valve in the hermetically sealed chamber is manually operated, it is possible to arrange for it to be automatically operated. For example in an aircraft installation comprising an altimeter in accordance with this invention and an ordinary, exposed, full range altimeter, the opening and closing of the air admission valve in the sealed chamber of the former instrument may be affected automatically e. g. electrically, under the control of the latter instrument; for example the exposed altimeter may operate contacts so arranged that (when the instruments have been set prior to a flight) the valve is closed as soon as the exposed altimeter reaches a predetermined (small) height reading and is automatically re-opened when said exposed altimeter returns to a predetermined height.

Such an arrangement is indicated schematically in Figure 3. A full range altimeter designated 1 is provided with an indicator pointer 2 movable in response to altitude changes by any known or suitable pressure responsive actuating device (not shown), the pointer being arranged to engage with relatively fixed contacts 3 and 4. A conductor 5 leads from the contact 3 to one end of the winding of a solenoid 6, the other end of the winding of which is connected by a conductor 7 to one terminal of a battery 8. The other terminal of the battery is connected to the pointer 2 by a conductor 9. The contact 4 is connected to a conductor 10 which leads to one end of the winding of a solenoid 11, the other end of the winding of which is connected to the battery 8 by a conductor 12. A solenoid plunger 13 cooperable with both solenoids 6 and 11 is formed as a rack meshing with a pinion 14 on the valve Q of an apparatus such as disclosed in Figure 1.

In operation, before the flight starts the pointer 2 will be at zero, the plunger 13 will be drawn to the left within the solenoid 6, and the valve Q will be open. During ascent the pointer 2 will engage the contact 3 to energize the solenoid 6 but this will not effect movement of the plunger 13 because it already is within the solenoid 6. After further ascent the pointer 2 will engage the contact 4, causing the solenoid 11 to be energized and the plunger 13 to be drawn to the right, thus closing the valve Q and sealing the casing i. When the ship reaches low altitude during descent the pointer 2 will engage contact 4 and momentarily energize solenoid 11, without effect. Upon further descent, the pointer 2 will engage contact 3, thereby energizing the solenoid 6 and drawing the plunger 13 to the left to open the valve Q.

What we claim is:

1. An altimeter of the aneroid barometer type comprising a hermetically sealed casing; an aneroid capsule mounted therein; an indicator operatively connected to said capsule; means protecting the interior of said casing against ambient temperature changes; a valve controlling communication between the interior of the casing and the external surrounding atmosphere; a movable scale associated with said indicator and marked in height units; and a second, independently movable scale marked in units of barometric pressure and associated with said first mentioned movable scale.

2. An altimeter of the aneroid barometer type comprising a hermeticaly sealed casing; an aneroid capsule mounted therein; an indicator comprising a rotary pointer operatively connected to said capsule; means protecting the interior of said casing against ambient temperature changes; a valve controlling communication between the interior of the casing and the external surrounding atmosphere; a movable scale associated with said indicator and marked in height units; and a second, independently movable scale marked in units of barometric pressure and associated with said first mentioned movable scale, said scales being concentric ring scales having the axis of rotation of said pointer as their centre.

3. In combination, an altimeter in accordance with claim 2, an ordinary known exposed height-indicating altimeter, and a control connection between said exposed altimeter and the valve operable through movement of the altimeter.

GEORGE MAURICE WRIGHT.
ARCHIBALD McLELLAN.